(12) United States Patent
Lawlor et al.

(10) Patent No.: US 10,967,443 B2
(45) Date of Patent: Apr. 6, 2021

(54) TOOL WITH LINEAR DRIVE MECHANISM, DUAL SPEED GEARBOX AND ELASTOMERIC CONTROL SYSTEM

(71) Applicants: Creative Motion Control, Inc., Woodinville, WA (US); Shawn Lawlor, Woodinville, WA (US); Charles C Cornelius, Coronado, CA (US)

(72) Inventors: Shawn Lawlor, Woodinville, WA (US); Charles C Cornelius, Coronado, CA (US)

( * ) Notice: Subject to any disclaimer, the term of this patent is extended or adjusted under 35 U.S.C. 154(b) by 318 days.

(21) Appl. No.: 15/525,824

(22) PCT Filed: Nov. 10, 2015

(86) PCT No.: PCT/US2015/060019
§ 371 (c)(1),
(2) Date: May 10, 2017

(87) PCT Pub. No.: WO2016/077389
PCT Pub. Date: May 19, 2016

(65) Prior Publication Data
US 2017/0334003 A1    Nov. 23, 2017

Related U.S. Application Data

(60) Provisional application No. 62/077,733, filed on Nov. 10, 2014.

(51) Int. Cl.
*B23D 17/04* (2006.01)
*B23D 29/00* (2006.01)
(Continued)

(52) U.S. Cl.
CPC ............ *B23D 17/04* (2013.01); *B23D 29/00* (2013.01); *B23D 29/02* (2013.01); *B25B 7/12* (2013.01);
(Continued)

(58) Field of Classification Search
CPC ...... F16H 3/72; F16H 25/20; F16H 2025/209; F16H 2025/2087; F16H 25/2252; H02K 7/06; H02K 7/116; H02K 11/24
(Continued)

(56) References Cited

U.S. PATENT DOCUMENTS 6,461,265 B1 * 10/2002 Graham .................. F16H 3/724
475/5
8,277,349 B2 * 10/2012 Erhart ....................... F16H 3/72
475/2

(Continued)

*Primary Examiner* — Hemant Desai
*Assistant Examiner* — Jacob A Smith
(74) *Attorney, Agent, or Firm* — Dean Craine; Marisa Whitaker

(57) ABSTRACT

A hand tool with a mechanical linear drive mechanism coupled to a work implement. The drive mechanism includes a roller screw with a torque tube connected to a roller screw's nut body. The roller screw includes a fixed outer race, a rotating set of rollers axially aligned inside the outer race, a cylindrical nut body located inside the set of rollers, a plurality of inner rollers axially aligned and inside the nut body, a threaded shaft axially aligned and inside the inner rollers, and a torque tube axially aligned inside the inner rollers. The torque tube is connected to a multiple speed gearbox which includes a primary motor coupled to a carrier gear with three planet gears. Disposed around the planet gears is an outer ring gear. Coupled to the outer ring gear is a secondary motor which when activated causes the ring gear to rotate in the opposite direction of the planet gears.

2 Claims, 18 Drawing Sheets

(51) Int. Cl.
  *F16H 25/20* (2006.01)
  *F16H 25/22* (2006.01)
  *F16H 3/72* (2006.01)
  *B23D 29/02* (2006.01)
  *F16H 37/12* (2006.01)
  *B25B 7/12* (2006.01)

(52) U.S. Cl.
  CPC ......... *F16H 3/727* (2013.01); *F16H 25/2021* (2013.01); *F16H 37/12* (2013.01); *F16H 25/2252* (2013.01); *F16H 2025/2081* (2013.01); *F16H 2025/2087* (2013.01)

(58) Field of Classification Search
  USPC .................................................. 173/5, 7, 181
  See application file for complete search history.

(56) References Cited

U.S. PATENT DOCUMENTS

| | | | |
|---|---|---|---|
| 2010/0320043 A1* | 12/2010 | Yamasaki | F16D 65/18 188/162 |
| 2011/0089877 A1* | 4/2011 | Blanding | H02K 11/27 318/432 |
| 2014/0245848 A1* | 9/2014 | Ikeda | F16H 25/2204 74/89.44 |

* cited by examiner

TOOL WITH LINEAR DRIVE MECHANISM, DUAL SPEED GEARBOX AND ELASTOMERIC CONTROL SYSTEM

TECHNICAL FIELD

This invention relates to linear drive mechanisms, and more particularly to linear drive mechanism that are portable and compact.

BACKGROUND ART

Portable hand tools are commonly used by emergency personnel to bend, spread or cut metal pieces to free drivers and passengers from their vehicles after accidents. The working implements on these hand tools are actuated by a linear mechanism coupled to a hydraulic cylinder. The hydraulic cylinder is coupled to a gas or electricity powered hydraulic pump.

One drawback with power hand tools that use hydraulic pumps is the hydraulic pump's periodic inspection and maintenance requirements. Another drawback is the tool's housing is elongated to accommodate the hydraulic pump, the linear mechanism and the working implement.

During use, the load exerted on the working implement on the hand tool varies. With hand tools that use hydraulic cylinders, check valves and by-pass valves are used to control the hydraulic pressure exerted on the work implement.

What is needed is a portable hand tool with an electric, non-hydraulic linear drive mechanism coupled to a work implement. What is also needed is a portable hand tool with a lightweight efficient multiple speed gearbox that may be used with a digital or mechanical control mechanism.

DISCLOSURE OF THE INVENTION

It is an object of the present invention to provide a portable hand tool lightweight, compact linear drive mechanism that uses a roller screw as a mechanical linear drive mechanism coupled to the tool's work implement.

The linear drive mechanism includes a roller screw threaded shaft with an external nut and rollers mounted over axially aligned threaded shaft longitudinally aligned inside the tool's elongated body. In one embodiment, the proximal end of the threaded shaft is coupled to a multiple speed gearbox that is coupled to a primary motor that can be operated in both forward and reverse directions at an optimal RPM.

The linear drive mechanism is located between the gear box and the work implement. It includes a nut body fixed axially inside the tool's outer housing so as the nut body is rotated, the threaded shaft moves axially inside the tool's outer housing. The linear drive mechanism includes a planetary roller screw that uses a torque tube connected to a roller screw's nut body. The planetary roller screw includes a fixed outer race, a rotating set of grooved rollers axially aligned inside the outer race, a cylindrical nut body located inside the set of grooved roller, a plurality of threaded inner rollers axially aligned and inside the nut body, a threaded shaft axially aligned and inside the inner rollers, and a torque tube fixed to the nut body. The nut body operates as an inner race for the grooved inner rollers. The torque tube is connected at one end to the gear box coupled to a primary motor. When the primary motor is activated, the torque tube is rotated which causes a threaded shaft in the tool to move axially inside the tool. A work implement is coupled to the distal end of the threaded shaft.

Mounted distally inside the elongated body and adjacent to the distal end of the roller nut is a tool implement coupler that attaches to the tool implement that extends from the tool's distal end. The tool implement may include two pivoting cutting jaws, two pivoting spreader jaws, or a ram bar.

Attached to the drive tube is a variable ratio gearbox coupled to a primary motor. The gear box responds to an increase in output torque by automatically increasing its effective speed reduction (gear ratio). This results in an increase in the output torque and a decrease in the output shaft speed. This effect can conserve the total power required for the drive motor even though the total output torque is increasing.

This effect is important and valuable in applications where limited amount of input power (motor size) is available to drive the system at high output speed when low levels of output work are required and at low output speed when high levels of output work are required.

In one embodiment, the drive shaft of the primary motor is connected to pinion gear that extends longitudinally. Surrounding the pinion gear is a coaxially carrier ring with three equal size planet gears mounted thereon. The planet gears include teeth that mesh with exterior teeth on the pinion gear. Surrounding the carrier ring is a coaxially aligned outer ring gear with inner teeth that also mesh with teeth on the planet gears. The outer ring gear is fixed relative to the pinion gears so that the carrier ring and the pinion gears rotate inside the outer ring gear. The gear ratio of the drive shaft on the primary motor and the pinion gear is approximately 1:5. The gear ratio of the pinion gear to the planet gears is approximately 1:5. The gear ratio of the planet gears and the outer ring gear is also approximately 1:5.

Coupled to the outer ring gear is a secondary motor which when activated causes the outer ring gear to rotate in a direction opposite of the planet gears thereby counteracting the 1:5 ratio mechanical advantage of the planet gears.

Coupled to the gear box is a torque adjustment and sensing system that measures the load exerted on the work implement. When the load on the work implement reaches a predetermined amount, the gear ratio from the primary motor to the drive tube is reduced. The output speed of the tool decreases and the tool's output torque increases.

In the embodiment shown herein, the torque adjustment and sensing system is an inner ring with a plurality of elastic spacers which resist compression. When excess force is exerted on the work implement, radial forces are exerted on the inner ring causing the elastic spacers to compress. When excessive forces are exerted on the work implement, the inner ring rotates and triggers sensors which automatically reduces the tool's speed and increase the torque.

An important component of the invention is the use of a cylindrical extension element that has an internal surface that has a cam shape profile. As the internal surface rotates progressively with the other components in response to the deformation of the elastic elements, the cam shape applies the ring gear brake assembly.

Attached to the tool may be a rechargeable battery to energize the primary and secondary motors.

BEST MODE FOR CARRYING OUT THE INVENTION

Figure 1:
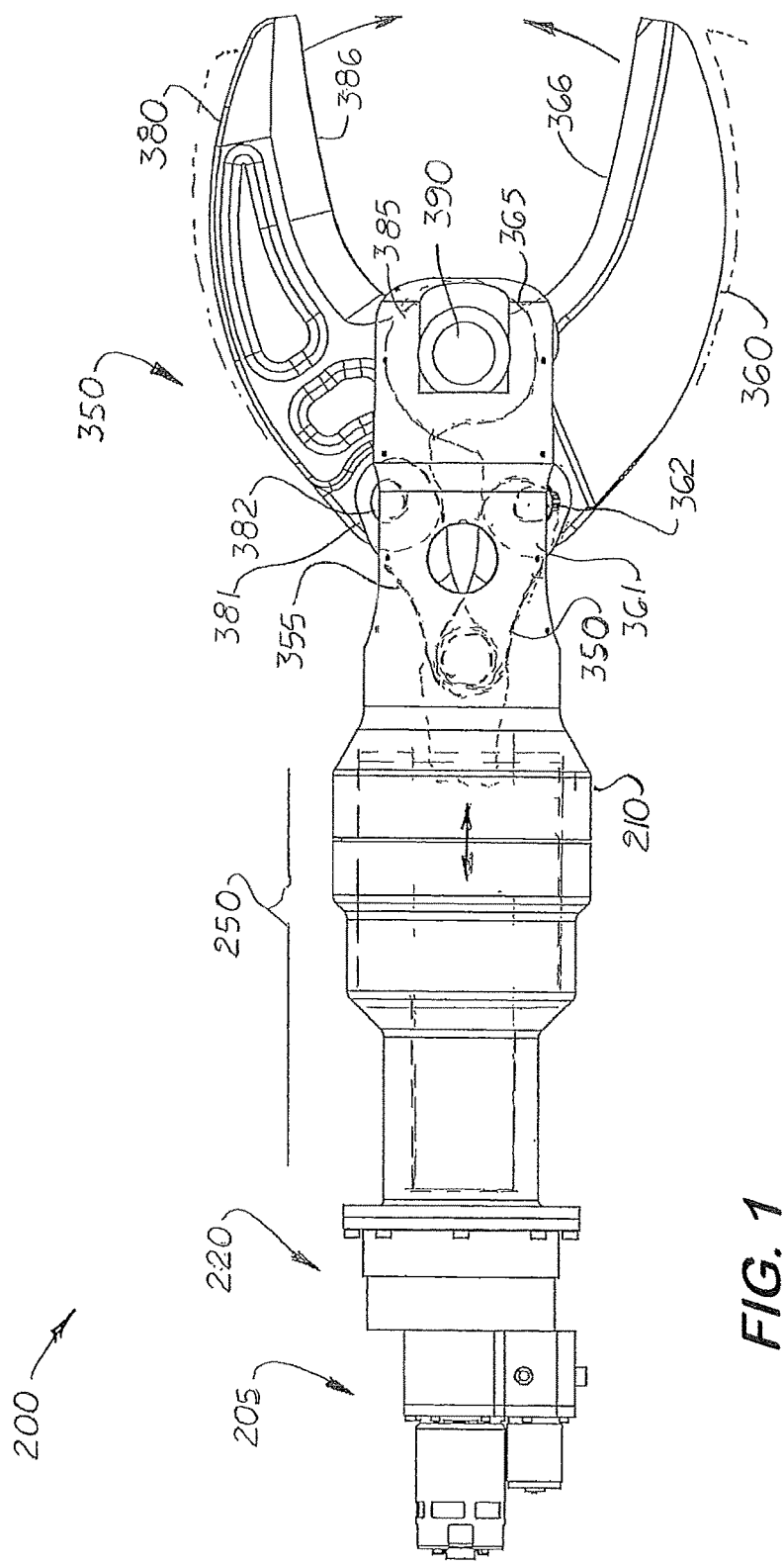
FIG. 1 is a side elevational view of a second embodiment of a tool with two cutting jaws and a geared planetary roller screw used as a linear drive mechanism.

FIGS. 1-9 show a tool 200 with lightweight linear drive mechanism that uses an electric motor assembly 205 coupled to a multiple stage, self-regulating gear box 220. Coupled to the gear box 220 is a geared planetary roller screw 250. The geared planetary roller screw 250 is similar to the roller screw shown in U.S. Pat. No. 2,683,379 (Strandgren) which is now incorporated herein.

The geared planetary roller screw 250 includes a fixed cylindrical, fixed outer race 260 axially aligned inside the tool's outer housing 210. The outer race 260 includes a plurality of internal, non-helical grooves 264. A dowel pin 268 is inserted in between the outer housing 210 and the outer race 260 to hold the outer race 260 inside the tool 200. A set screw 270 is used to retain the dowel pin 268 in the outer housing 210.

Located adjacent inside the outer race 260 is a plurality of outer grooved rollers 275. Formed on each end of the outer grooved rollers 275 are axially aligned axles 278 that engage bores formed on two spacer rings 280 coaxially aligned inside the outer housing 210. Each grooved roller 275 includes a plurality of non-helical grooves 282 configured to mesh with the non-helical grooves 264 formed on the outer race 260. During operation, the set of grooved rollers 275 and two spacer rings 280 rotate inside the outer housing 210.

Located adjacent and inside the grooved rollers 275 is a cylindrical nut body 288 configured to rotate inside the outer housing 210. The nut body 288 includes a plurality of external non-helical threads 290 that mesh with the non-helical grooves 282 on the grooved rollers 275. The nut body 288 acts as an inner race for the outer groove rollers 275. The nut body 288 also includes a plurality of internal helical threads 292. The non-helical threads 290 on the external surface of the nut body 288 allow the nut body 288 to rotated but prevent the nut body 288 from moving axially inside the outer housing 210.

Located adjacent and inside the nut body 288 is a plurality of axially aligned inner rollers 300. Each inner roller 300 includes external helical threads 304 that mesh with the internal helical threads 292 on the inside surface of the nut body 288. Each inner roller 300 includes at its opposite ends a set gear teeth 306 that engage two ring gears 309 aligned transversely inside the outer housing 210. Formed on the two ring gears 309 are a plurality of external teeth that mesh with the gear teeth 306 on opposite ends of the inner rollers 300. During operation the inner rollers 300 individually rotate on their longitudinally axis and rotate around a threaded shaft 310 that extends coaxially and inside the outer housing 210.

The threaded shaft 310 includes a plurality of helical external threads 314 that extend substantially the entire length and mesh with the helical threads 304 on the inner rollers 300. In the embodiment shown herein, the threaded shaft 310 is approximately twice as long as the inner rollers 300. The threaded shaft 310 is hollow with a proximal end and a distal end. Attached to the distal end is a combination end cap/clevis 320.

Disposed inside the outer housing 210 is a torque tube 330 that includes a narrow cylindrical hollow neck 334 and a wide cylindrical body 338. The neck 334 is configured to surround the rear portion of the threaded shaft 310 that extends rearward from the inner rollers 300. The cylindrical body 338 is configured to extend outward and partially extend around the exterior surface of the nut body 288. Formed between the inside surface of the cylindrical body 328 and the adjacent surface of the nut body 288 are two keyways. A complementary key 340 is inserted into each keyway to affix the torque tube 330 to the nut body 288. Formed on the proximal end of the torque tube 330 are one or more receiving bores that receive pegs 222 that extend longitudinally inward from the gear box 220.

During operation, the primary motor 210 is activated which causes the pegs 222 on the gear box 220 to rotate. The rotation of the pegs 222 on the gear box 220 causes the torque tube 330 to rotate which causes the nut body 288 to rotate. Because the grooved rollers 275 prevent the nut body 288 from moving longitudinally inside the outer housing 210, the inner rollers 300 rotate and engage the threads 304 on the threaded shaft 310 causing the threaded shaft 310 to move longitudinally inside the outer housing 210.

Figure 2:
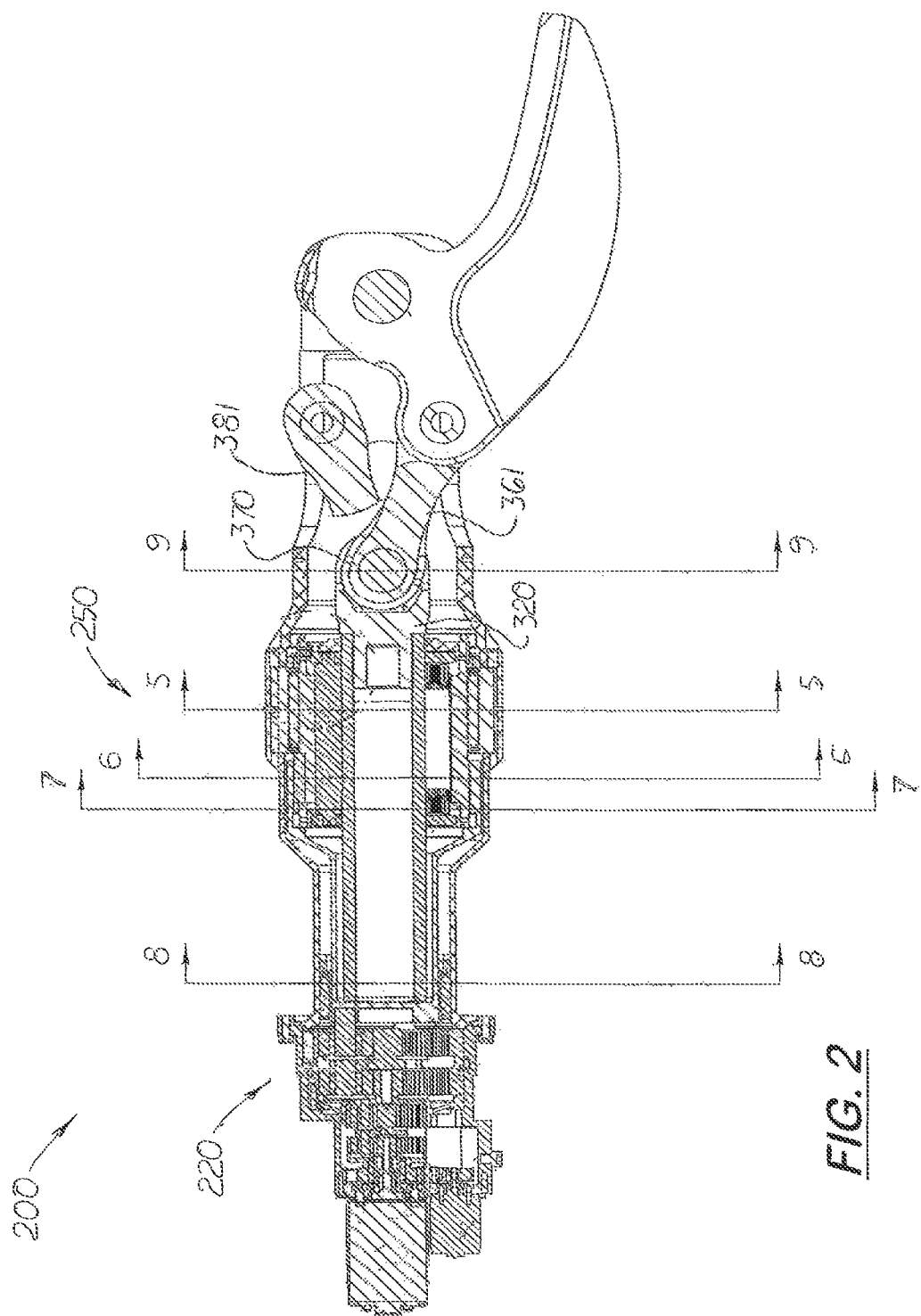
FIG. 2 is a sectional side elevational view of the tool shown in FIG. 1.

FIGS. 1 and 2 show the tool implement 350 with two cutting jaws 360, 380 extending from the distal end of the outer housing 210. The two cutting jaws 360, 380 include cutting blade edges 366, 386 and middle sections 365, 385, respectively, rotatingly coupled together by a rigid front pin 390. The rear section 361, 381 of each jaws 360, 380, respectively, is pivotally connected to a linkage arm 350, 355, respectively. The rear end of each linkage arm 350, 355 is connected to a combination end cap/clevis 320 (shown in FIG. 4) which is connected to the end cap 320. During use, the threaded shaft 330 moves axially inside the outer housing 210 causing the rear sections 361, 381 of the two jaws 360, 380 to move towards or away from the front pin 390 and thereby opening and closing the jaws 360, 380.

Figure 10:
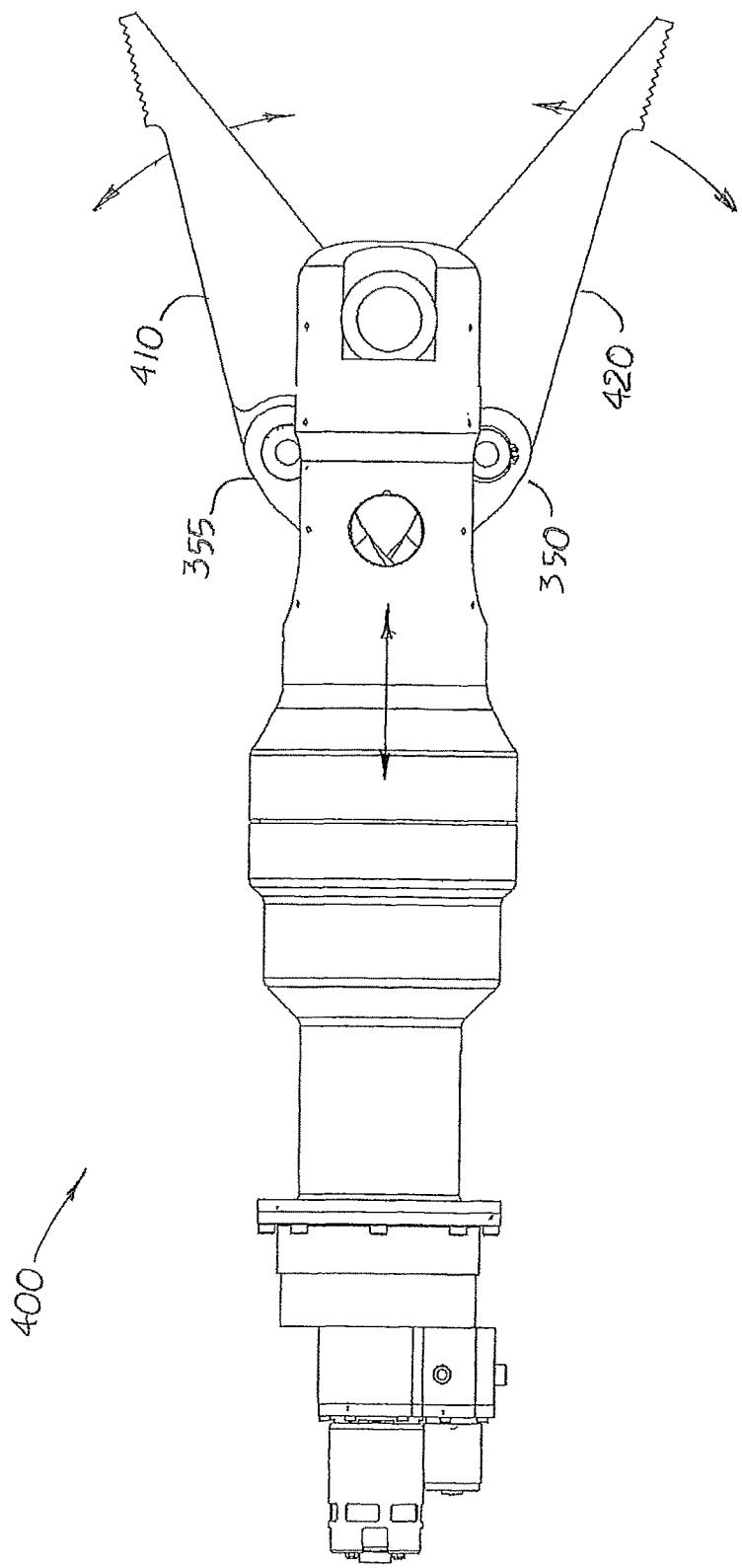
FIG. 10 is a side elevational view of a tool with two spreader jaws
Figure 11:
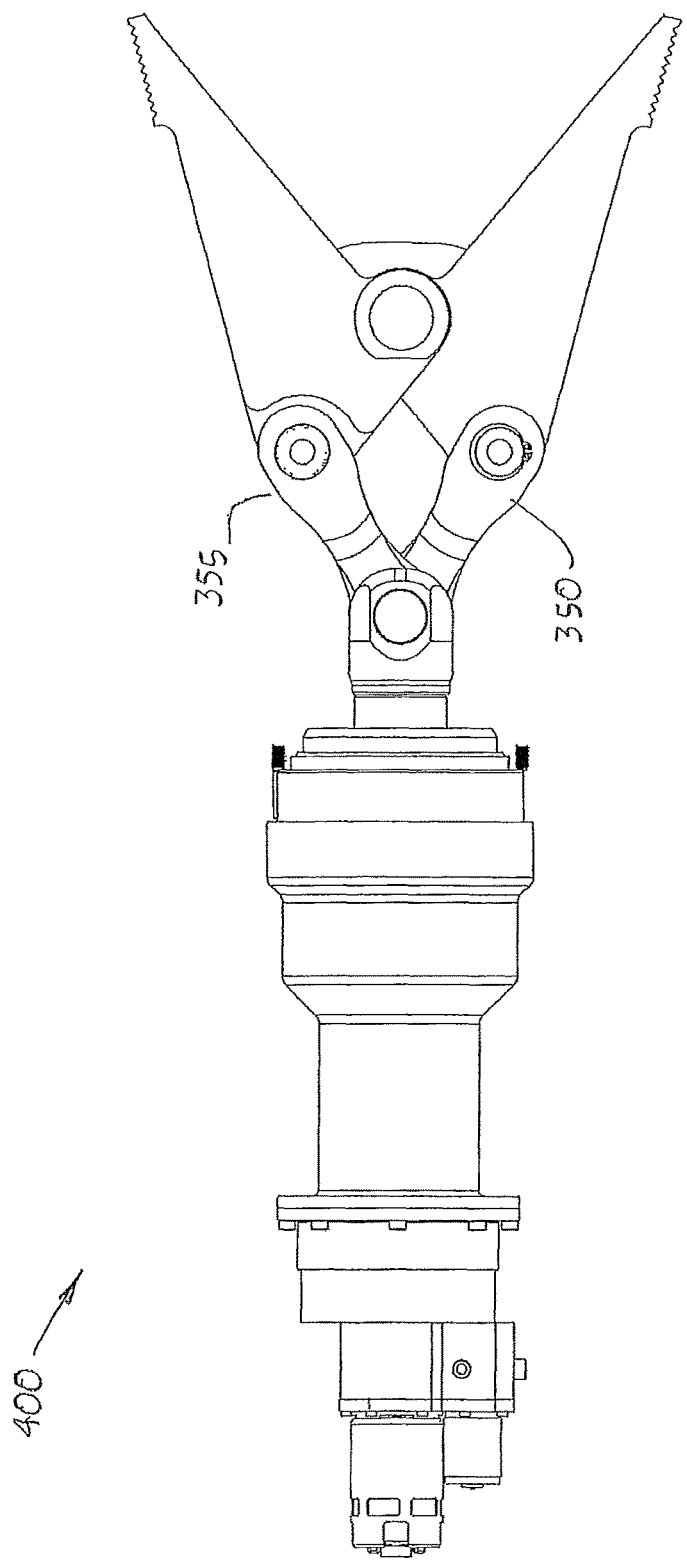
FIG. 11 is a side elevation view of the tool shown in FIG. 10 with the front section of the outer housing removed to show the linkage arms coupled to the spreader arms.

FIGS. 10 and 11 are side elevational views of a tool implement 400 with two spreader jaws 410, 420 that extend from the distal end of the tool housing. The spreader jaws 410, 420 are connected to linkage arms 350, 355 and operate in a manner that enables the spreader arms 410, 420 to open and close.

Figure 12:
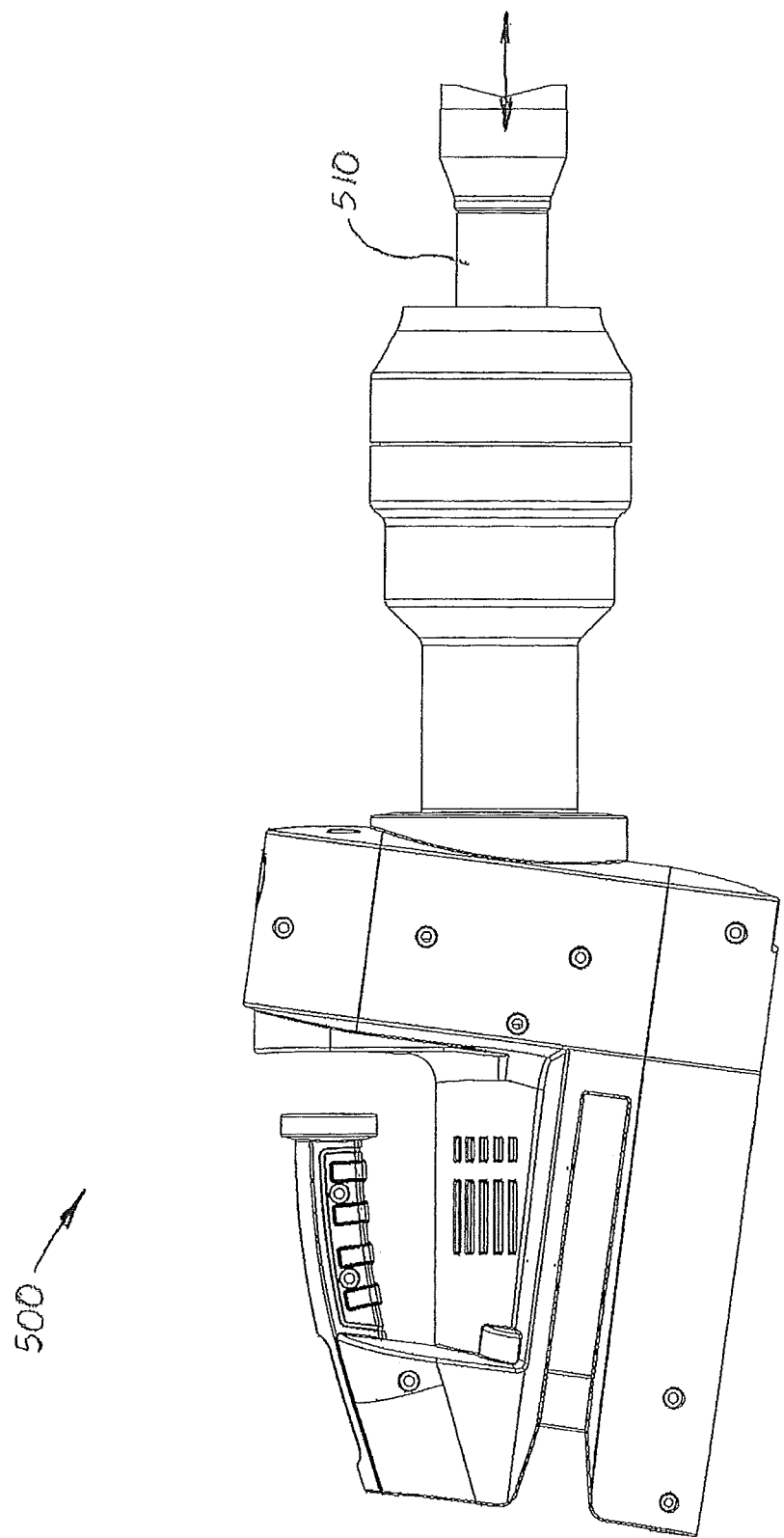
FIG. 12 is a side elevational view of a tool with a ram bar extending longitudinally from the front section.
Figure 13:
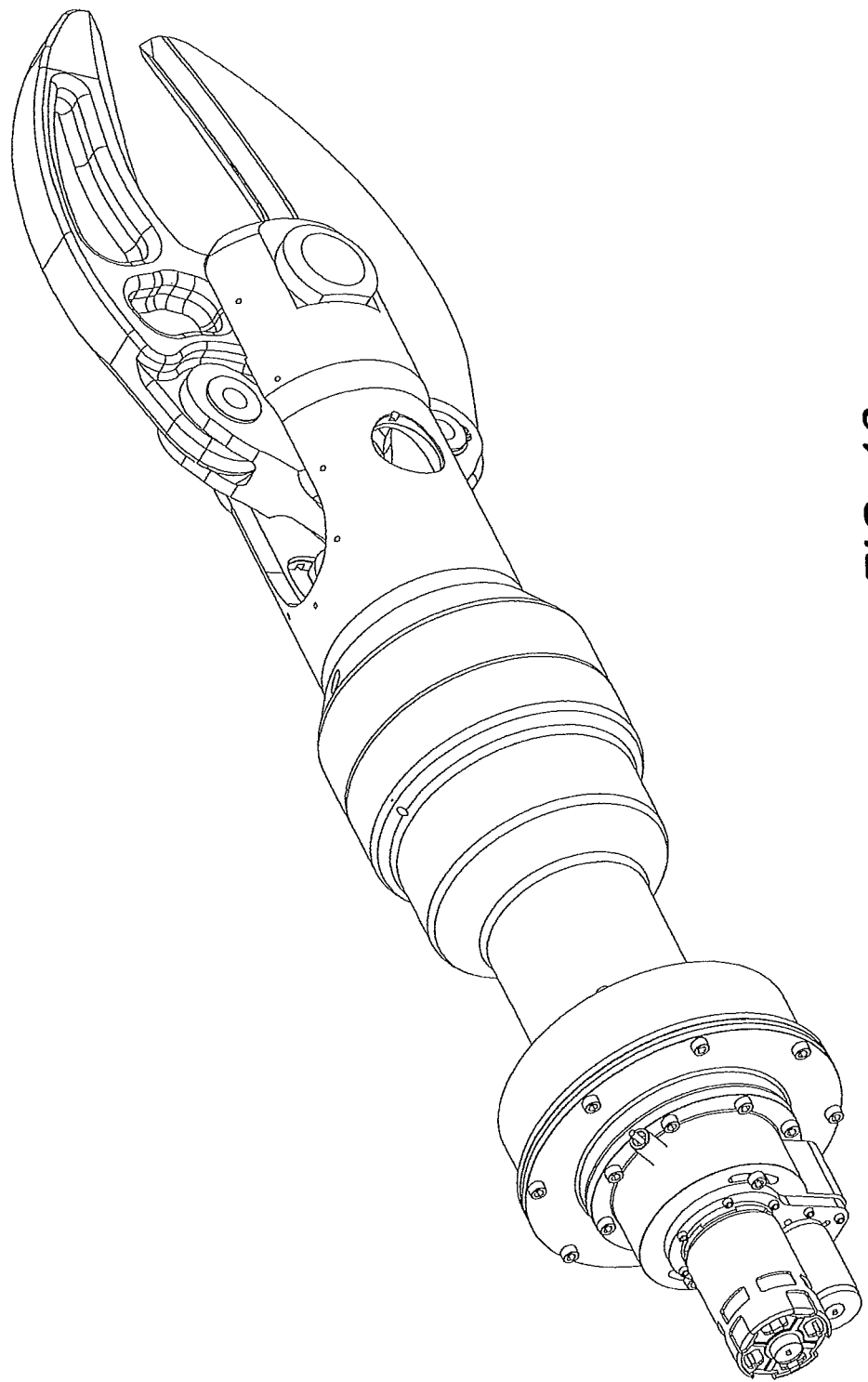
FIG. 13 is a perspective view of the tool with a multiple speed gearbox and elastomeric control mechanism.
Figure 14:
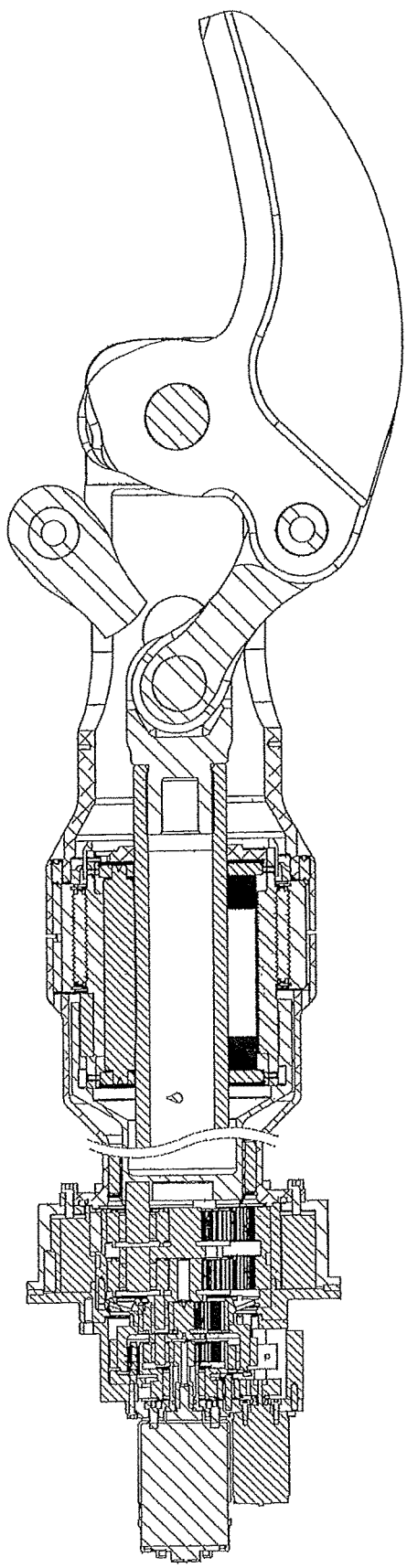
FIG. 14 is a sectional side elevational view of the tool shown in FIG. 13.
Figure 15:
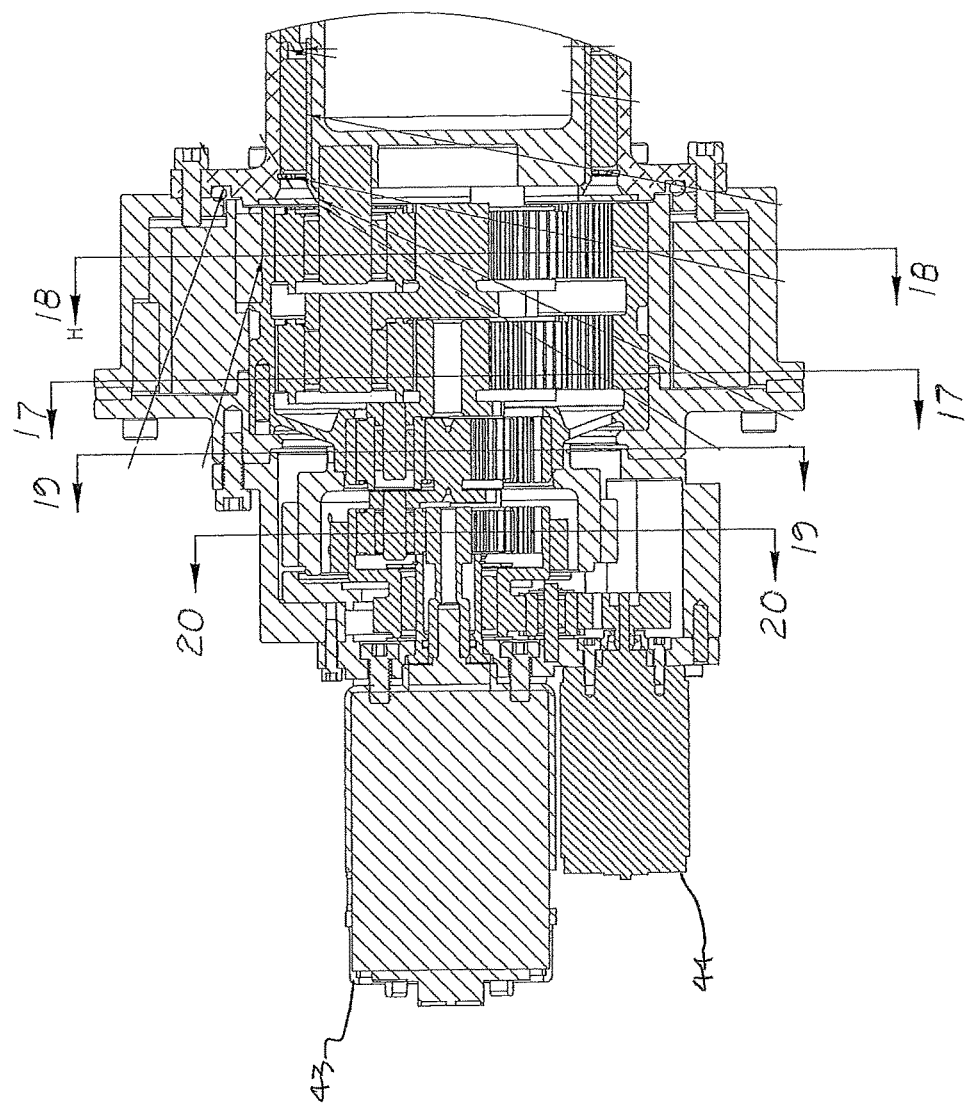
FIG. 15 is a sectional side elevational view of the multiple speed gearbox and the elastomeric control mechanism.
Figure 16:
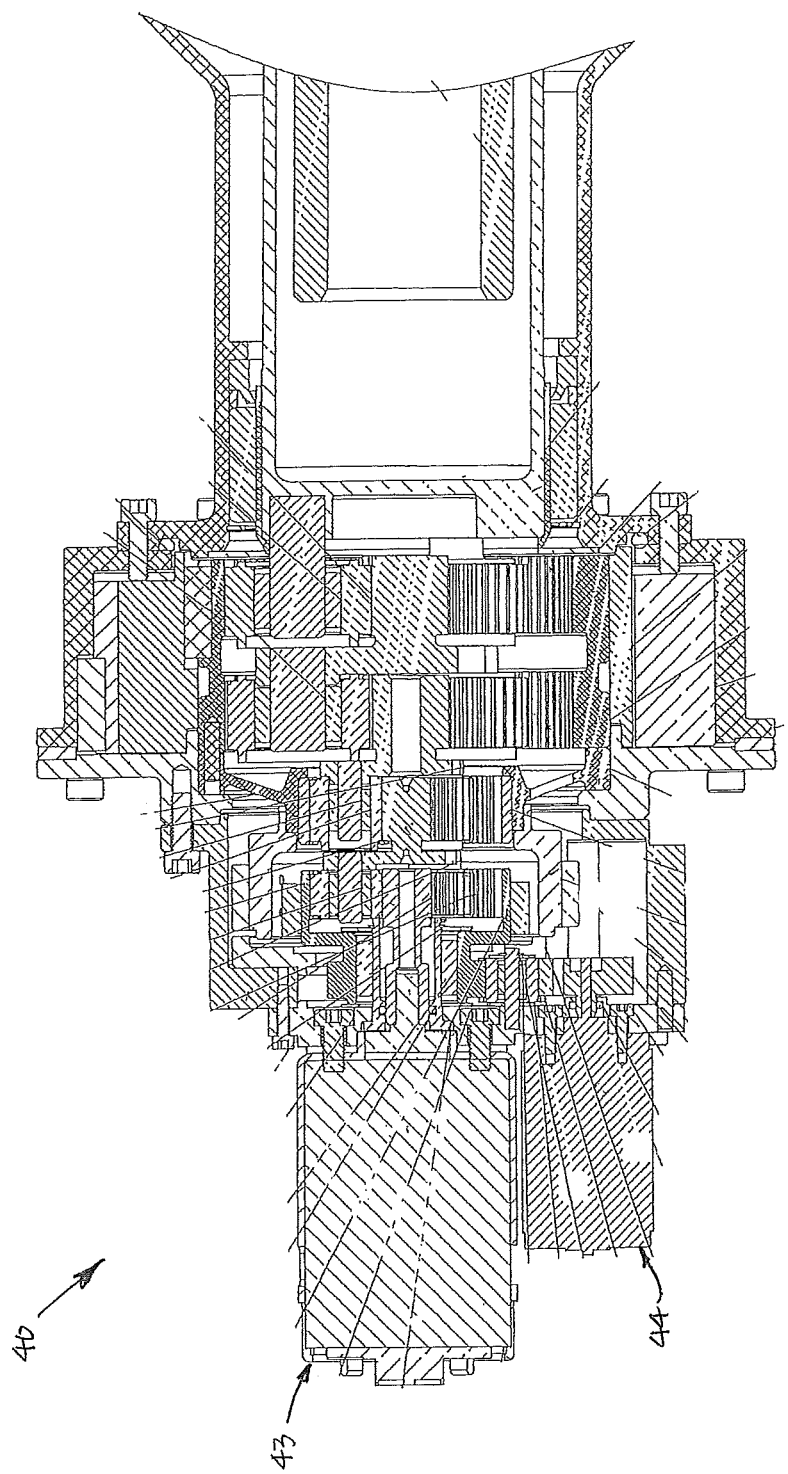
FIG. 16 is another exploded view of the multiple speed gearbox and the elastomeric control mechanism.
Figure 17:
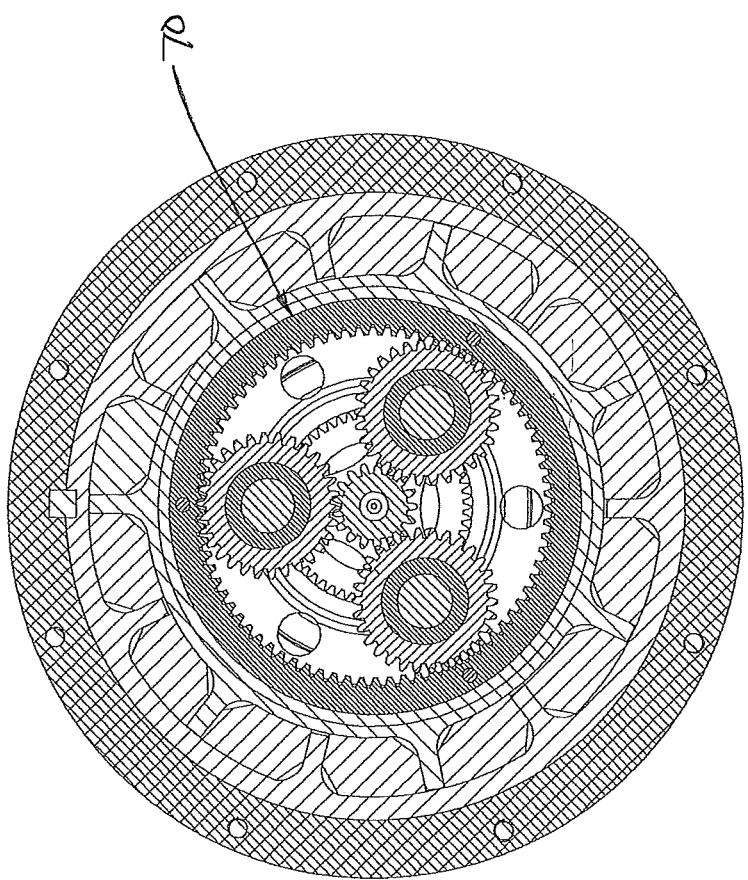
FIG. 17 is an rear end elevational view of the tool taken along line 17-17 in FIG. 15 showing the outer housing showing the inner ring, a plurality of elastic elements located in slots formed on the ring, the ring gear disposed inside the inner ring, the three planet gears attached to a carrier ring and located inside the ring gear and the pinion gear attached to the primary motor's drive shaft.
Figure 20:
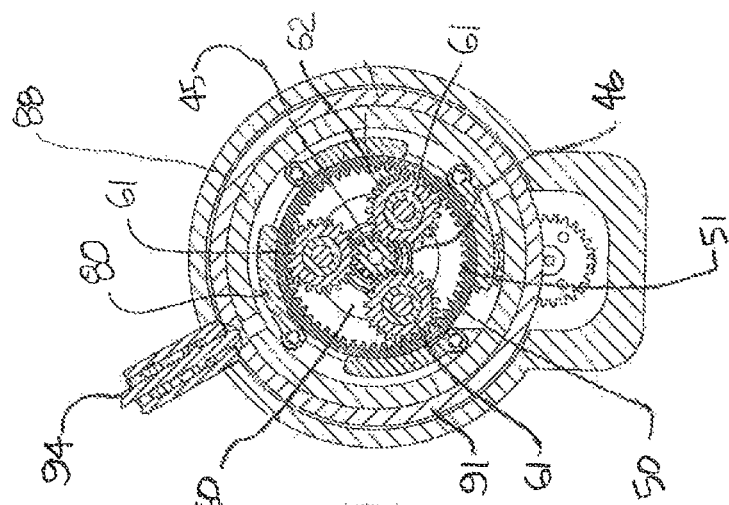
FIG. 20 is an end sectional view taken along line 20-20 in FIG. 15.
Figure 19:
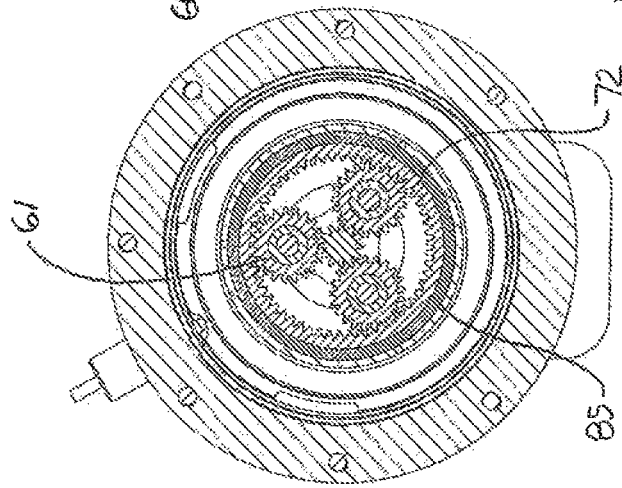
FIG. 19 is an end sectional view taken along line 19-19 in FIG. 15.
Figure 18:
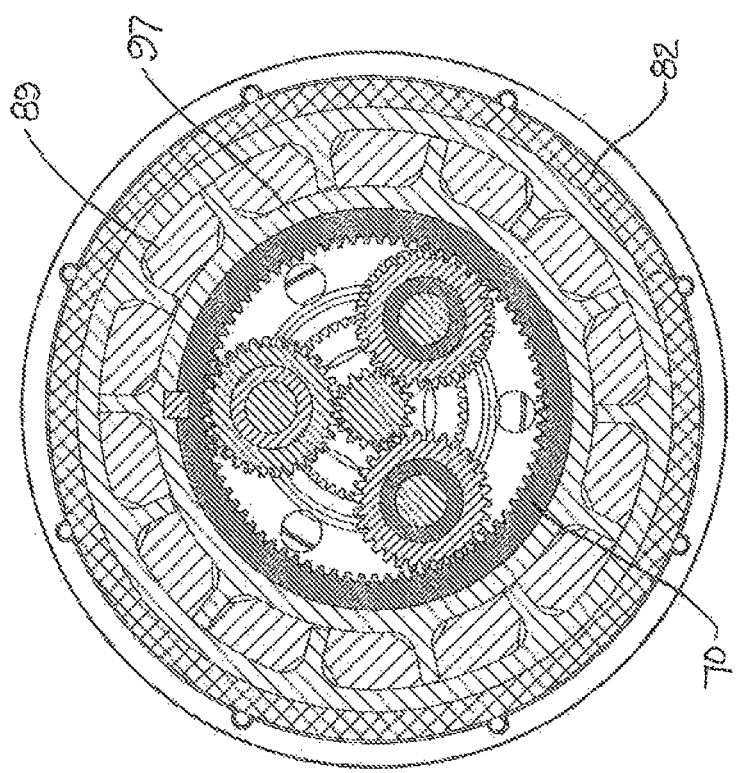
FIG. 18 is an end sectional view taken along line 18-18 in FIG. 15.

FIG. 12 is a side elevational view of a tool implement 500 with a ram bar 510 extending longitudinally from the distal end of the tool housing. The ram bar 510 is connected directly to the distal end of the end cap 320 or to the threaded shaft 310. Attached to the drive tube is a multiple speed, self-adjusting gearbox coupled to a primary motor.

The drive shaft of the primary motor 43 is connected to an input pinion gear 45 that extends longitudinally. Surrounding the input pinion gear 45 is a coaxial carrier ring 60 with three equal size planet gears 61 mounted thereon. Each planet gear 61 includes teeth 62 that mesh with exterior teeth 46 on the input pinion gear 45. Surrounding the carrier ring 60 is a coaxially aligned outer ring gear 50 with inner teeth 51 that also mesh with teeth 62 on the planet gears 61. The outer ring gear 50 is fixed relative to the planet gears 45 so that the carrier ring 60 and the pinion gear 45 rotate inside the outer ring gear 50. The gear ratio of the pinion gear 45 on the primary motor 43 and the outer pinion gear 45 is approximately 5.5:1.

Coupled to the outer ring gear 50 is a secondary motor 44 which when activated causes the ring gear 50 to rotate in a direction opposite of the planet gears 61 thereby counteracting the 5.5:1 ratio mechanical advantages of the planet gears 61.

The gearbox 40 is designed to respond to an increase in output torque by automatically increasing its effective speed reduction (gear ratio). The result of this is that for a given input shaft speed, as the output torque of the gearbox 40 increases its output shaft speed decreases. This effect can be used to conserve the total amount of power required for the primary motor 43 even though the total output torque is significantly increasing. This effect is particularly important and valuable in applications where a limited amount of input power (motor size) needs to produce high output speeds when low levels of output torque are required and low output speeds when high levels of output torque are required.

Figure 3:
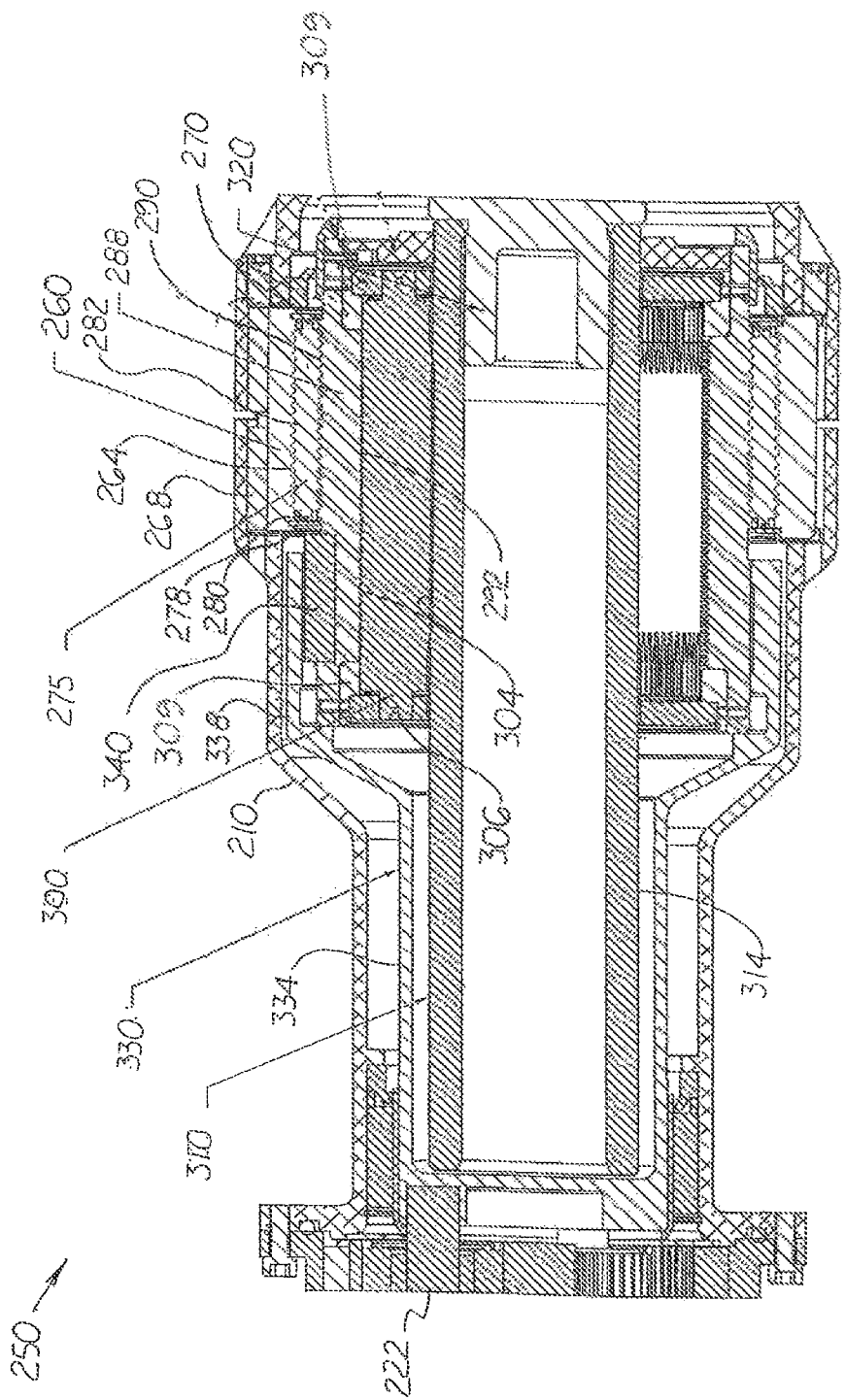
FIG. 3 is an enlarged, partial sectional side elevational view of the geared planetary roller screw located inside the tool shown in FIGS. 1 and 2.
Figure 4:
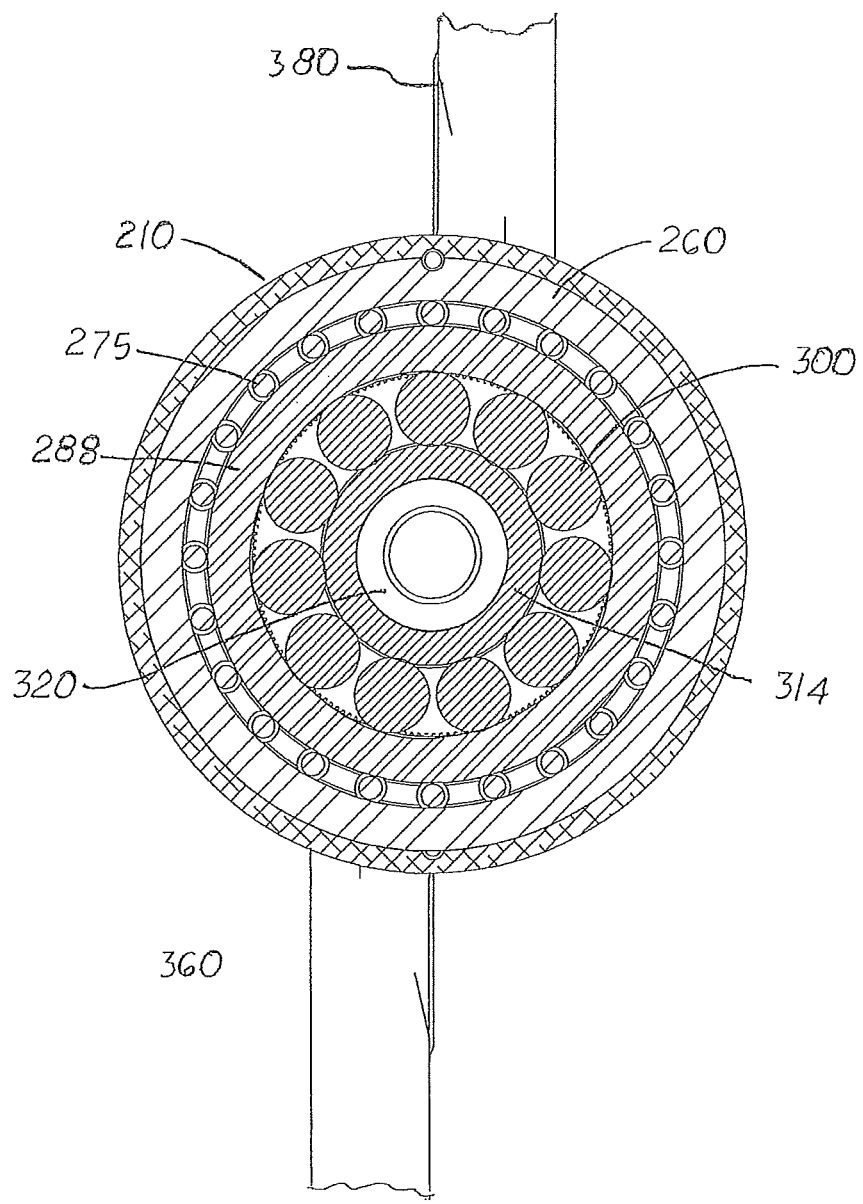
FIG. 4 is an end sectional view taken along line 4-4 in FIG. 2.
Figure 5:
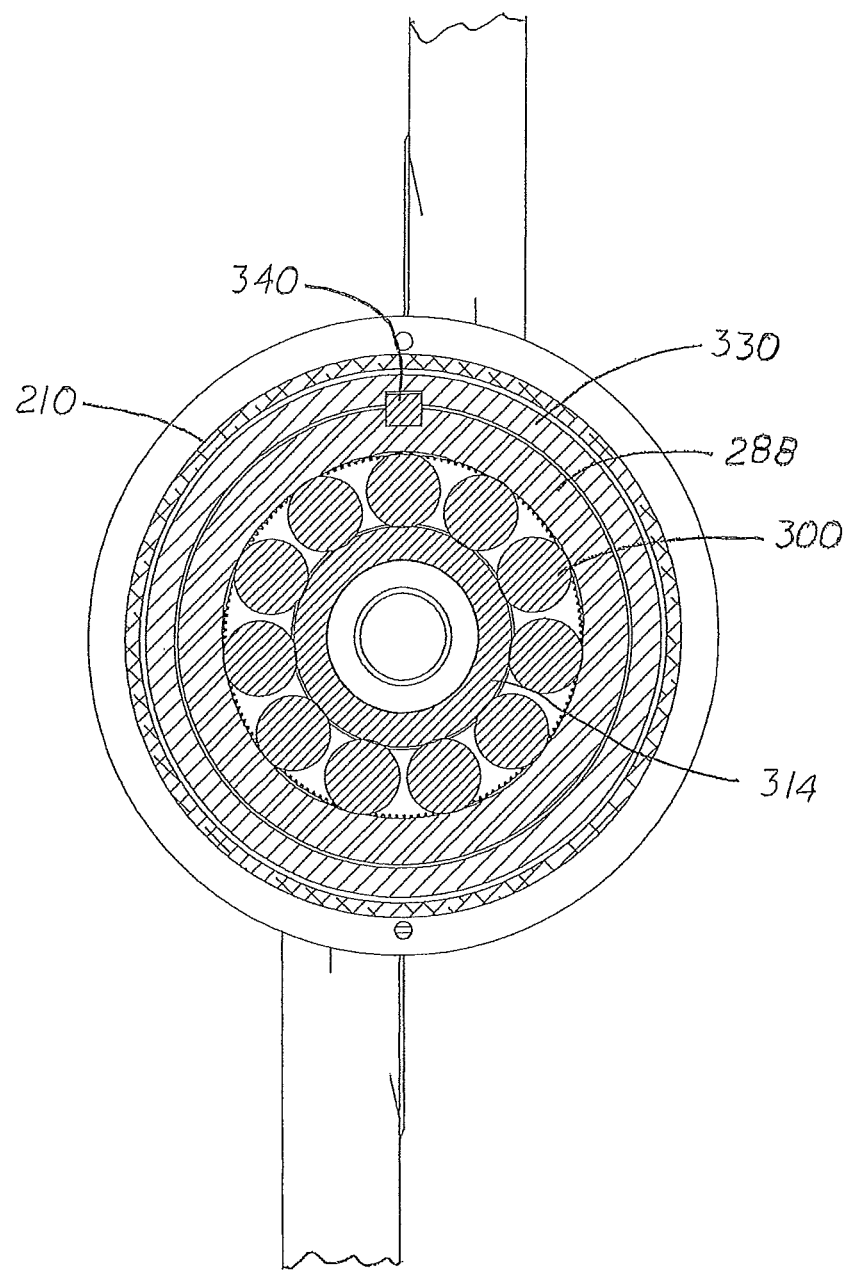
FIG. 5 is an end sectional view taken along line 5-5 in FIG. 2.
Figure 6:
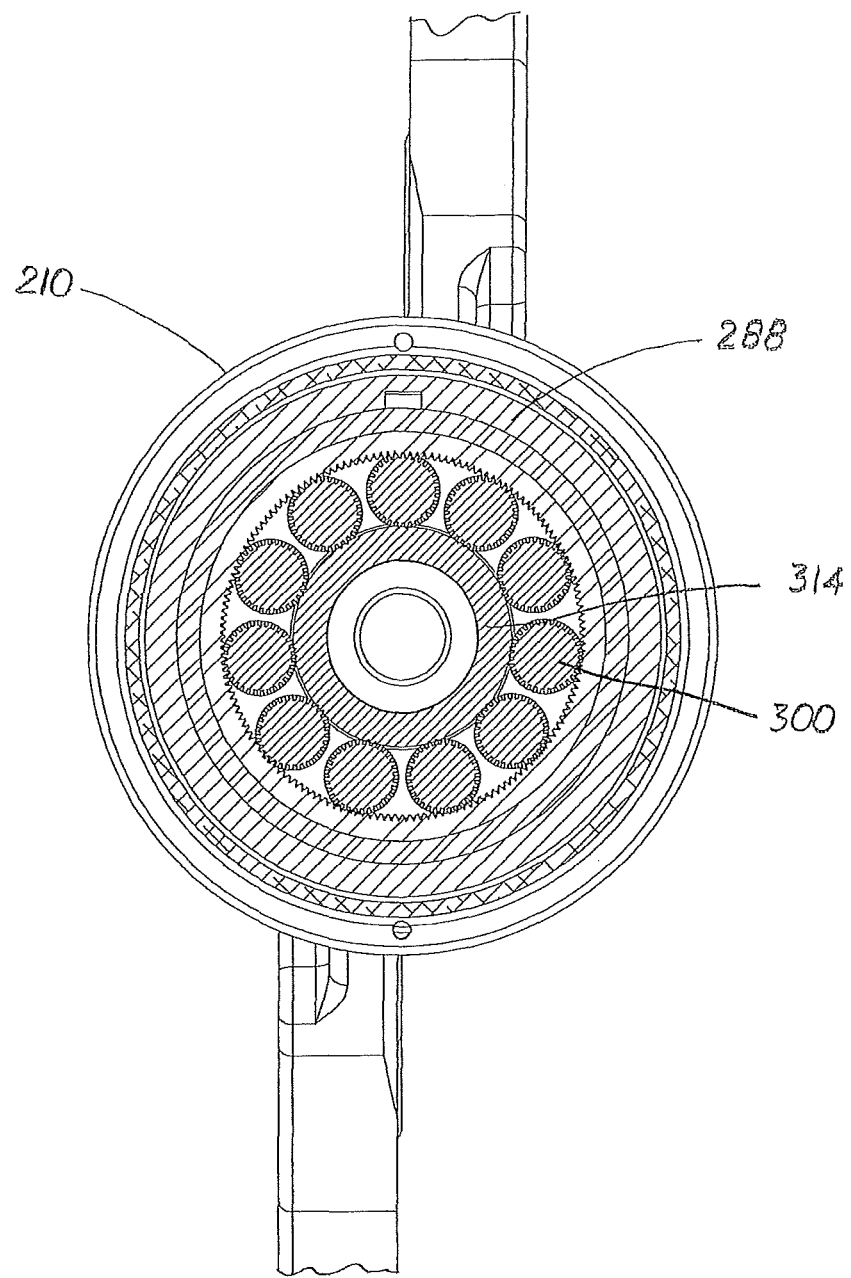
FIG. 6 is an end sectional view taken along line 6-6 in FIG. 2.
Figure 7:
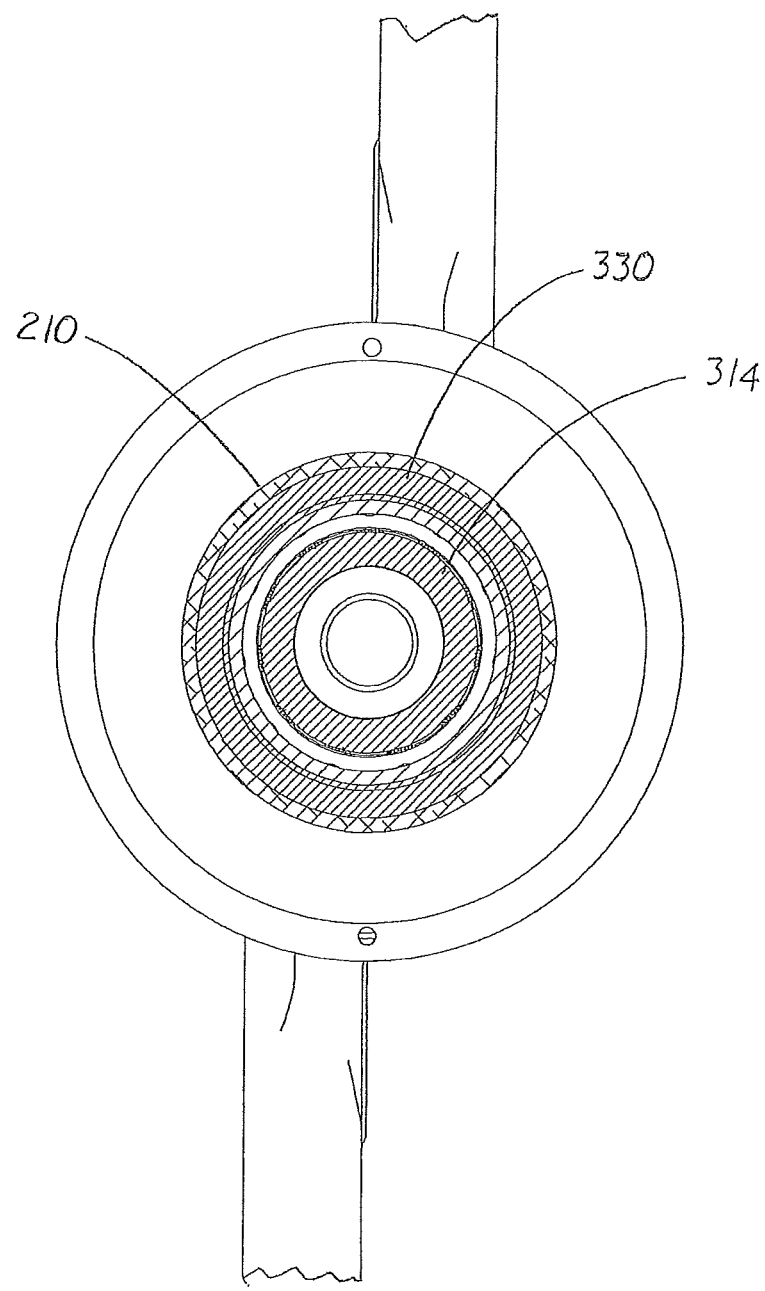
FIG. 7 is an end sectional view taken along line 7-7 in FIG. 2.
Figure 8:
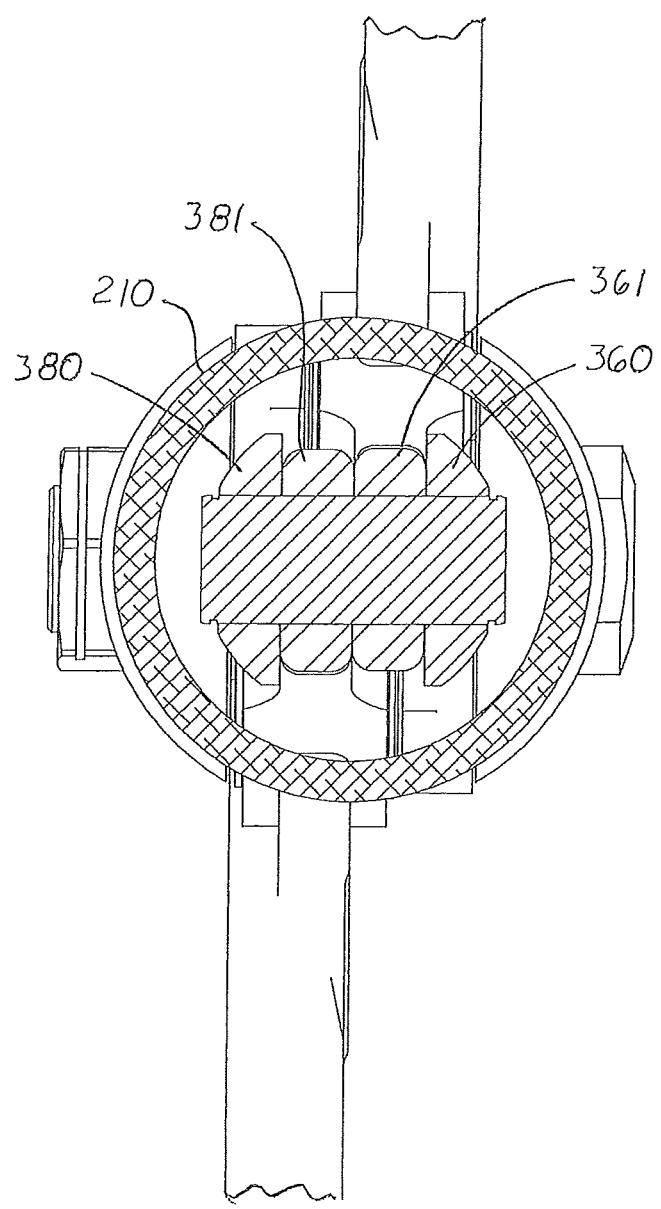
FIG. 8 is an end sectional view taken along line 8-8 in FIG. 2.
Figure 9:
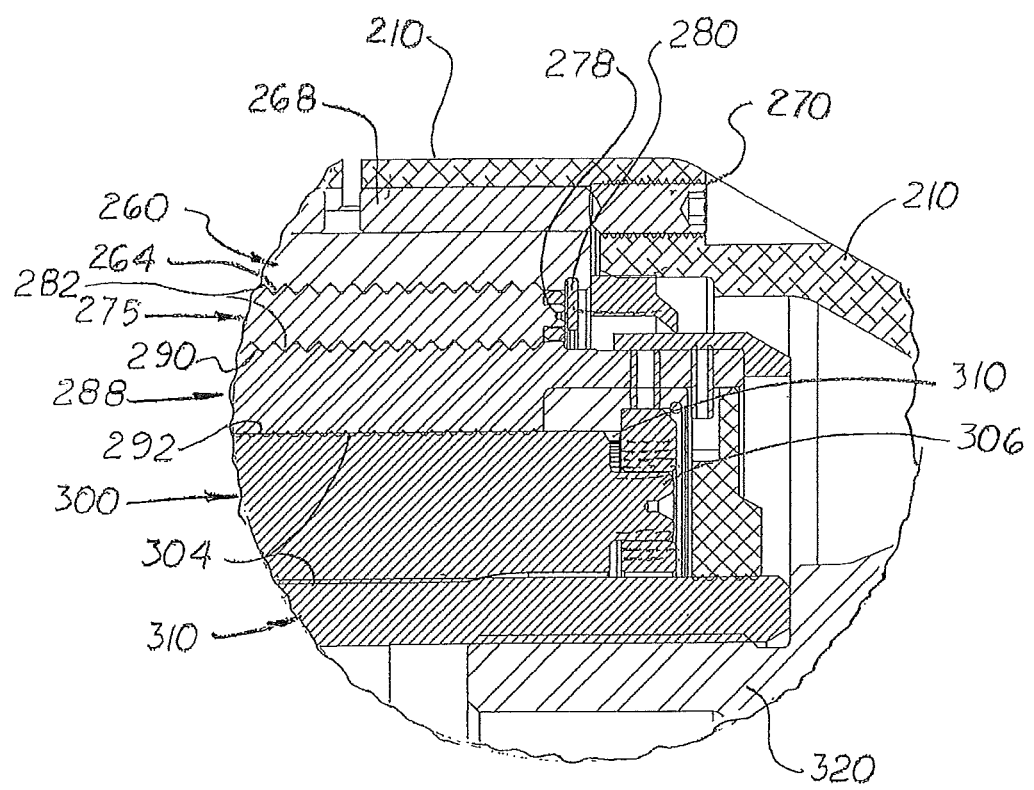
FIG. 9 is an exploded view of the dowel pin, the outer race, the grooved roller located inside the outer race, the snap ring, the nut body located inside the grooved roller, the inner threaded roller, ring gear, the wiper seal, and the threaded shaft.

The output torque of the gearbox drives pins 222 shown in FIG. 3 which in turn provides the necessary input torque to the roller screw assembly also shown in FIG. 3. This roller-screw system converts the output torque from the gearbox into the force used by the tool to operate its blades or spreading elements 380, 410, respectively.

Referring to FIGS. 16-20, input power is provided by primary motor 43 which supplies input torque to the gearbox 40 via the input pinion gear 45. The gearbox 40 is a four stage planetary or epi-cyclic gearbox where the ring gears 70, 72 for stages two, three and four are effectively stationary from a system gear ratio standpoint. The outer ring gear 50 for stage one, is controlled and either held fixed by an internal brake assembly 80 or driven by the secondary motor 44.

When the outer ring gear 50 is fixed and not allowed to rotate by the brake assembly 80, the overall speed reduction of the gearbox 40 is maximized and the output speed (rotation rate of drive pins 222 in FIG. 3) of the gearbox 40 is minimized. When the internal brake assembly 80 holding the outer ring gear 50 is released and the secondary motor 44 is energized such that outer ring gear 50 is rotated, then the effective speed reduction (gear ratio) of the first stage of the gearbox 40 is reduced.

The third and fourth stage ring gear 70 is supported radially and axially by the gearbox housing 82 but is free to rotate within the gearbox housing 82. It is supported in the circumferential direction (rotationally) by a series of elastic elements 89 which progressively deform as the output torque of the system increases. The deformation of these elastic elements 89 results in the progressive rotation of the third and fourth stage ring gear 70, the second stage ring gear 72 and a cylindrical extension element 88. Cylindrical extension element 88 has a control profile 91 incorporated into its outside diameter. The deformation of these elastic elements 89 in response to the output torque of the gearbox 40 provides the control feedback for the system thus acting as a torque sensing system. In the current embodiment, the progressive rotation of control profile 91 relative to the stationary external gearbox housing 82 is used to open or close the control switch 94 for the secondary motor 44.

The internal surface of the cylindrical extension element 88 includes a profile or cam shape. As the internal surface rotates progressively with all the other components in response to the deformation of the elastic elements 89, the cam shape applies the ring gear brake assembly 80 (also seen in FIG. 20). More specifically, coupled to the gearbox 40 is a torque adjustment system that measures the load exerted on the work implement. When the load on the work implement reaches a predetermined amount, the outer ring gear 50 is allowed to rotate faster thereby reducing the gear ratio from the primary motor 43 to the output drive pins 222. The output speed of the tool decreases as the tool's torque increases.

In the embodiment shown herein, the torque adjustment system is an inner ring 97 with a plurality of elastic spacers 89 which resist compression. When excess force is exerted on the work implement 380, 410, tangential forces are exerted on in the inner ring 97 causing the elastic elements 89 to compress. When excessive forces are exerted on the work implement 380, 410, the inner ring 97 rotates and triggers sensors 94 which automatically-reduces the tool's speed and increases the torque.

In compliance with the statute, the invention described has been described in language more or less specific on structural features. It should be understood, however, that the invention is not limited to the specific features shown, since the means and construction shown comprises the preferred embodiments for putting the invention into effect. The invention is therefore claimed in its forms or modifications within the legitimate and valid scope of the amended claims, appropriately interpreted under the doctrine of equivalents.

INDUSTRIAL APPLICABILITY

This invention may be used in industries that use with hand tools with a work implement that is linearly activated. More particularly, this invention will used in industries that use hand tools with linear activated work implements that sense the amount of torque exerted on the working implement and automatically adjusts its operational speed.

We claim:

1. A linear drive mechanism for a compact lightweight tool with a linear actuated work implement, comprising:
   a. a tool housing;
   b. a roller screw disposed inside said tool housing and configured to convert rotary motion from an electric motor to linear movement;
   c. a work implement linked to said linear movement of said roller screw;
   d. a primary motor with a pinion gear;
   e. a self-adjusting, multiple speed gearbox disposed between said primary motor and said roller screw, said multiple speed gearbox includes a carrier ring coaxially aligned with said pinion gear, said carrier ring includes three inner planet gears that mesh with said pinion gear, said gearbox also includes an outer ring gear that meshes with said inner planet gears;
   f. a secondary motor coupled to said outer ring gear that causes said outer ring gear to rotate in the opposite direction of said planet gears thereby counteracting the ratio mechanical advantage of said planet gears when said secondary motor is activated;
   g. a brake assembly configured to selectively stop rotation of said outer ring gear;
   h. a torque adjustment system configured to automatically detect changes in force exerted on said work implement and activate said brake assembly to stop rotation of said outer ring gear; and
   i. an electricity source connected to said primary motor and said secondary motor.

2. The linear drive mechanism as recited in claim 1, wherein said torque adjustment system includes a sensor and an inner ring disposed around said outer ring gear, said inner ring includes a plurality of elastic elements that are deformed when excess torque is exerted on said outer ring gear and controls said secondary motor.

* * * * *